(No Model.)
S. N. CORTHELL.
HEEL TRIMMING CUTTER.
No. 343,758. Patented June 15, 1886.
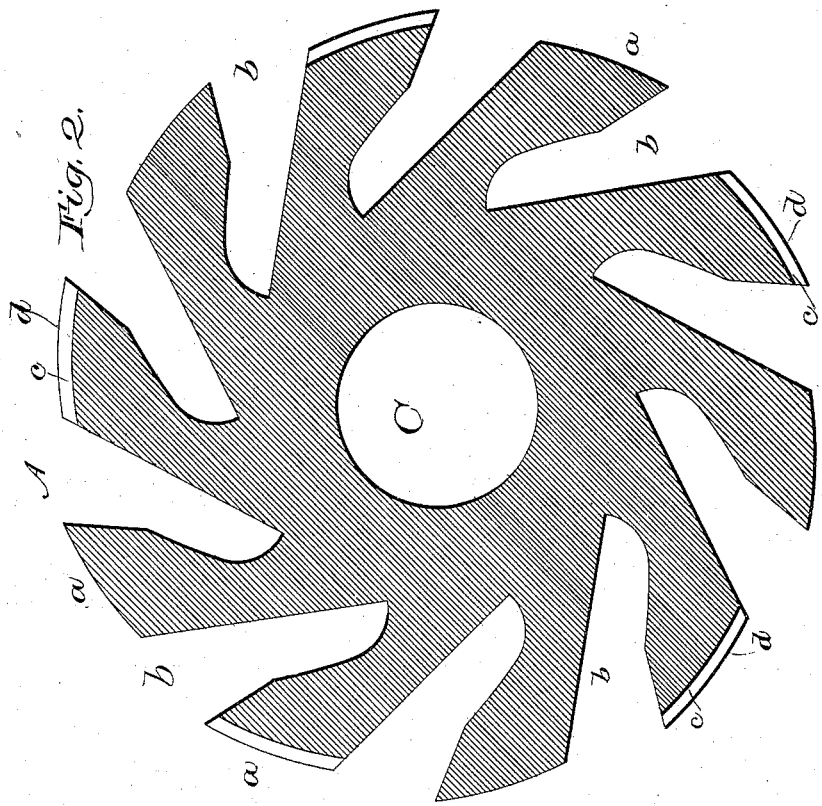
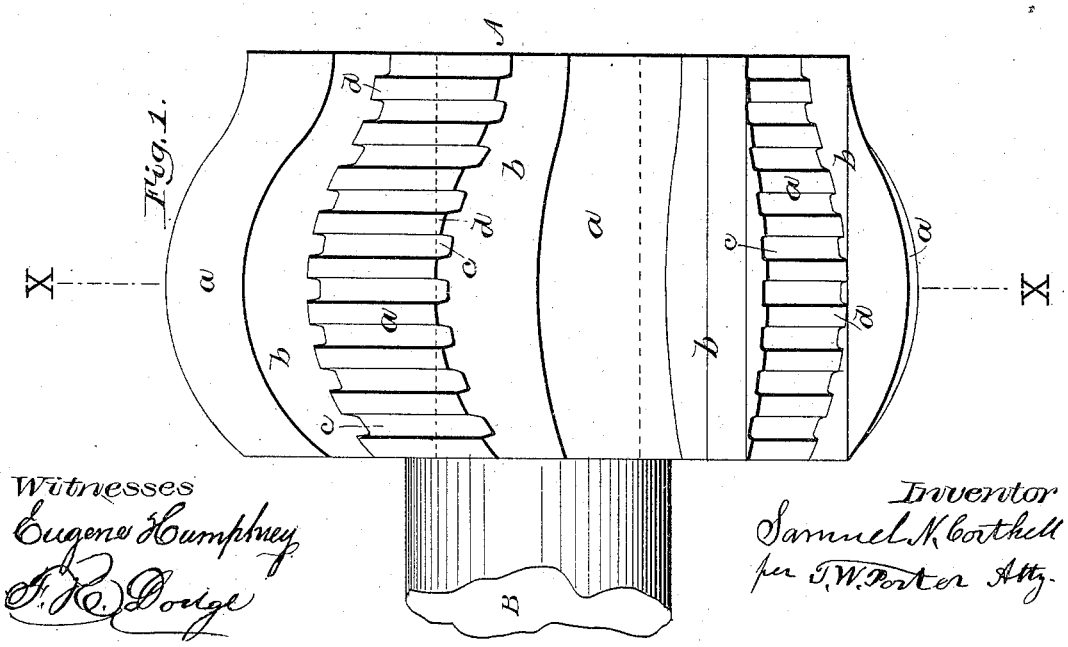
Witnesses
Eugene Humphrey
F. R. Dodge
Inventor
Samuel N. Corthell
per T. W. Porter Atty.

UNITED STATES PATENT OFFICE.

SAMUEL N. CORTHELL, OF QUINCY, MASSACHUSETTS.

HEEL-TRIMMING CUTTER.

SPECIFICATION forming part of Letters Patent No. 343,758, dated June 15, 1886.

Application filed February 8, 1886. Serial No. 191,247. (No model.)

*To all whom it may concern:*

Be it known that I, SAMUEL N. CORTHELL, of Quincy, in the county of Norfork and State of Massachusetts, have invented a new and useful Improvement in Heel-Trimming Cutters, which will, in connection with the accompanying drawings, be hereinafter fully described, and specifically defined in the appended claim.

Figure 1 is a top plan view of a cutter embodying my invention. Fig. 2 is a diametric or transverse section taken as on line X X, Fig. 1, and viewed as from the right in that figure, both being enlarged views.

In said views, A represents the cutter, shown in Fig. 1 as mounted on the usual arbor, B, inserted in axial passage C of the cutter. The periphery of the cutter is subdivided by a series of longitudinal slots, $b$, which leave as a remainder the teeth $a$, which are in an old and well-known manner formed with peripheral eccentricity to the axial center of the cutter to constitute clearance, and are also formed with sufficient rake or hook to insure an easy cut when in use. In every alternate tooth $a$, I form a series of slots, $c$, which leave the raised "lands" $d$, which constitute the operative or cutting portion of the tooth which is thus grooved. The grooves $c$ and lands $d$, being formed in the circumferential direction of the cutter and transversely to its axis, and of uniform depth in all parts, will not be changed or affected by the grinding away of the front face of the tooth in sharpening it, but will so long as the cutter remains operative retain their depth and width and other relations to the tooth. The advantage of thus converting every alternate tooth into a series of narrow teeth is, that the tendency of cutters having all their teeth with a continuous edge is to consolidate and pack the leather, and thus cause the cutter to "chatter" and cut an uneven surface, while if all the teeth are formed with a broken surface with lands or ribs $d$ in each tooth in the path of the channels $c$ of the following tooth the sole is not sufficiently compacted to insure the requisite smoothness of cut, but is left rough and with a ragged and yielding surface; but with every alternate tooth $a$ formed with a broken edge or series of narrow minor teeth, $d$, while the other teeth, $a$, have a continuous cutting-edge, the teeth $a$ thus subdivided act as pioneers for the teeth having a continuous edge by breaking up or diversifying the surface of the heel, while the continuous-cut teeth reduce the surface to uniform smoothness, and thus a more perfectly finished heel is produced with the expenditure of less force and strength than is requisite with a cutter not thus formed.

It will be obvious that cutters having a peripheral contour unlike that shown, and adapted to trim other of the various styles of heels may be made with the essential features of my invention, and that the depth, width, and relative number of the grooves $c$, as also the outline of their cross-section, may be varied as shall in different kinds of work be advantageous.

I claim as my invention—

A rotary cutter having two kinds of teeth arranged in alternating order, one kind of said teeth having a continuous and the other a broken or interrupted cutting-edge, substantially as specified.

SAMUEL N. CORTHELL.

Witnesses:
  T. W. PORTER,
  ALBAN ANDRÉN.